INFORMATION STORAGE DEVICE

Filed Oct. 9, 1959 4 Sheets-Sheet 1

Inventor
J. VanGoethem

By Robert Harding Jr.
Attorney

Inventor
J.VanGoethem

By Robert Harding Jr.
Attorney

Feb. 20, 1968 J. VAN GOETHEM 3,370,277

INFORMATION STORAGE DEVICE

Filed Oct. 9, 1959 4 Sheets-Sheet 3

Inventor
J. VanGoethem

By Robert Harding Jr.
Attorney

Feb. 20, 1968 J. VAN GOETHEM 3,370,277

INFORMATION STORAGE DEVICE

Filed Oct. 9, 1959 4 Sheets-Sheet 4

Inventor
J. VanGoethem

By Robert Harding Jr.
Attorney

United States Patent Office 3,370,277
Patented Feb. 20, 1968

3,370,277
INFORMATION STORAGE DEVICE
Jan Van Goethem, Antwerp, Belgium, assignor to International Standard Electric Corporation, New York, N.Y., a corporation of Delaware
Filed Oct. 9, 1959, Ser. No. 845,362
Claims priority, application Belgium, Nov. 24, 1958, 573,237
5 Claims. (Cl. 340—173)

Figure 1:
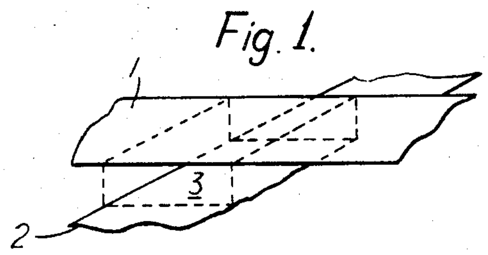

The invention relates to an information storage device comprising a two coordinate arrangement of capacitors each being connected between a particular pair of electrical conductors, one conductor out of a first set and the other conductor out of a second set. The principle of such an arrangement is known for example from the U.S. Patent No. 2,695,398.

In these known arrangements, ferro-electric condensers are used, each ferro-electric condenser constituting a cell of a two dimensional memory array. They may for instance be constructed by using a slab of ferro-electric material such as barium titanate and by providing two sets of parallel strip electrodes, one set on each face of the slab and the strips of the second set being perpendicular to those of the first. In this way, any ferro-electric cell defined by the intersection of two strip electrodes can be selected in a well known manner so that the corresponding condenser can be saturated in one particular direction. Any pattern of binary information comprising as many bits of information as there are intersections between the two sets of strip electrodes can thus be stored, and at any desired later moment, parts or the whole of the stored information can be extracted in a well known manner by applying for example a pulse on one strip electrode of the first set and extracting the corresponding pulses on all the strip electrodes of the second set and which will be produced for those cells which are caused to change their saturation state by the reading pulse.

Such an arrangement man constitute a large capacity storage device and at any desired moment, one may extract information or modify the previously stored information or part thereof. Such a memory device is however, relatively expensive not only in the actual construction of the memory itself, but also in view of the amount of switching equipment necessary to read the information and also to modify the previously stored information. This modification of the previously stored information can be done rather rapidly by selecting the cells or rows of cells, the conditions of which are to be modified in accordance with the new information to be recorded, but such means to modify the information and which are relatively expensive are hardly justified when changes in the previously stored information do not have to be made frequently.

In many instances, what is required is a semi-permanent memory where the "rate" at which the information has to be changed is relatively small. Such semi-permanent information storage devices may find applications for instance in telecommunication systems and particularly telephone systems, in computer systems, in stock listing systems and in general in all systems handling relatively numerous bits of information. In telephone systems for example, such a memory would be useful for telephone number translations, for class of service recording, for routing information, etc. For such systems, this type of information storage device has generally been labelled changeable translator.

A comprehensive survey of changeable translators is to be found in the article entitled "Some basic concepts of translators and identifiers used in telephone systems" by H. H. Schneckloth published on page 588 of the July 1951 issue of the Bell System Technical Journal. Among the various changeable translators referred to in this article is the well known card translator which has so far been apparently the most successful practical changeable translator for telephone systems. Such a card translator is for example described in the U.S. Patent No. 2,605,965. Essentially it consists in using sets of perforated cards which are arranged as a stack. Each of these cards or the combination of more than one card corresponds to an input number and upon this number being known, the card or cards may be mechanically selected out of the stack and reading of the selected cards may then be performed by photocell or phototransistor arrangements which will detect the presence or absence of holes. This selection will permit the extraction of a large number of information items corresponding to each input number. Such a translator is more suitable as a semi-permanent memory, since no complicated means for reinscribing information are required. Whenever the information corresponding to one particular input number has to be modified, a new perforated card may simply be inserted in place of the previous one. More information on the use of such a card translator in a telephone system can be found in the U.S. Patent No. 2,834,835.

Nevertheless, while the card translator gives good performance in practice, it is still a relatively complicated device and contrary to the more expensive ferro-electric memory initially mentioned, the stored information cannot be read at a fast rate.

One object of the present invention is to combine the advantages of a relatively fast rate of reading the stored information by entirely static means, with a relatively inexpensive structure and where particular attention has been paid to simplify to the utmost the way in which the stored information is to be modified.

To quote the last sentence of that part of the article referred to above dealing with translators: "what is always welcome is lower cost, particularly the cost of making changes."

It is precisely another object of the invention to satisfy these aims.

In accordance with a first characteristic of the invention, an information storage device as defined at the beginning of this description, is characterised in that at each cross point between a conductor of the first set with a conductor of the second set are arranged two fixed electrodes closely spaced from one another, the first connected to the conductor out of said first set, and the second connected to the conductor out of said second set, and that at least for some of the crosspoints there are provided dielectric pieces and/or third electrodes closely spaced from the fixed pair of electrodes whereby depending on the presence or absence of said dielectric pieces and/or said third electrodes and/or whether the latter are grounded or floating, the effective capacitive coupling between the two conductors may assume one or the other out of two substantially distinct values.

In accordance with another characteristic of the invention, an information storage device as characterised above is further characterised in that said dielectric pieces and/or said third electrodes are mounted on slide strips which may for instance be parallel to the conductors out of said first set, and which slide strips may be positioned near corresponding pairs of said fixed electrodes.

With such an arrangement as described above, one obtains a particularly inexpensive semi-permanent storage device which is essentially mechanical but static. Each conductor out of the first set may constitute an input conductor to which A.C. energy will be applied, for example a sine wave. Then, depending on the positions of the intermediate electrodes or dielectric pieces along the slide strip corresponding to this input conductor, the input energy will be selectively coupled to combinations of conductors of the second set via capacitive couplings, whereas very little energy will reach the remaining conductors out of the second set via the residual capacitive couplings. Thus, output codes or words may simply be registered for instance by arranging electrodes along these strips. Once the strips are inserted, the information is permanently stored and can never vanish in normal circumstances.

Foremost, the information can be modified at any time by merely removing a strip from its position and replacing it by a new one bearing the new word in the form of a combination of electrodes on its surface. Thus, changes in translation can be made as simply as in the so-called slide bar translators such as described in the U.S. Patent No. 2,361,246 and referred to in the above article. But, this slide bar translator is a relatively intricate mechanical device which, as remarked in the above article, is relatively slow owing to its mechanical elements and has limited traffic capacity. Moreover, with the present slide strips, no hooking or similar operations are required when removing or inserting a slide strip, whereas the slide bars of the earlier device must be associated each time with operating and restoring springs.

The semi-permanent memory of the invention offers also the advantage of a very large capacity. One may for instance use it with a thousand words each corresponding to a particular input number, and the words may each be composed of ten bits comprising two series of five bits each used in accordance with the two out of five code. This capacity is of course, only an example and in particular, both the number of words and the number of binary bits per word could be considerably increased. However, when such a memory presents a relatively large surface due to the information storage capacity required, it becomes rather bulky and cumbersome. Moreover, the capacities of the memory may differ considerably depending on the applications envisaged.

Another object of the invention is to realize an information storage device such as defined above and presenting the advantage of permitting the realization of memories of variable information storage capacities, including large capacities, by using a small volume and by avoiding extreme dimensions.

In accordance with another characteristic of the invention, an information storage device as previously characterised, is further characterised by the fact that it is constituted by a plurality of individual devices in the form of plates which are stacked one next to the other, and each plate being separated from the following one by a grounded metallic screen.

In this manner, a memory comprising for instance a thousand input conductors and twenty output conductors may be divided into fifty individual memories for instance, each comprising twenty inputs and twenty outputs, these individual memories being stacked one above the other but each being separated from the next by a metallic screen. In this way, one obtains a reduced volume and the possibility to constitute memories of various capacities while avoiding undesirable capacitive couplings between separate and superposed input conductors.

In order to obtain two well distinct capacitive coupling values between the fixed electrodes connected to the conductors of the first group and the fixed electrodes connected to the conductors of the second group, one may use sliding strips of which certain parts have a relatively large dielectric constant with respect to other parts. In this way, at the cross point where a sliding strip introduces a certain dielectric thickness, the coupling capacity will be noticeably increased with respect to other cross points met by the sliding strips at points where the latter is not constituted by such a dielectric, e.g. an opening. Nevertheless, generally available insulating materials and which might be used to constitute coupling strips do not offer very high dielectric constants. One will however be able to considerably increase the coupling capacity by using a maximum dielectric thickness between the two electrodes at the cross points where this capacitive coupling is desired. Another solution would consist in using for the sliding strips, at any rate for parts thereof, ferromagnetic materials such as ferrites which offer the advantage of a very high dielectric constant with respect to ordinary insulators.

Another particular solution for realising the desired capacitive coupling consists in coating the sliding strip by metallic electrodes constituting the said third electrodes and this on its two opposite faces. The two opposite electrodes may be electrically interconnected in orderd to form only a single one, for example on the side of the sliding strip, which may amount to envisage a U-shaped electrode which is slidably inserted on the strip at the appropriate point. One may still envisage any other metallic connection interconnecting the two opposite electrodes through the thickness of the strip. In this case the dielectric constant of the strip has relatively little importance and may be small. At points where the strip is not coated on its two faces by a pair of electrodes, the capacitive coupling will be slight, while at the other cross points it may be relatively high and if the pairs of electrodes constituting the third electrodes borne by the strip are each very near from the first and second fixed electrodes respectively coupled to the input and the output conductor. Of course, care will be taken to avoid any metallic contact between the fixed electrodes, either by appropriate guiding means for the said strips, or preferably by a coating of the outside surface of the electrodes. For instance, a suitable varnish may be applied at the surface of the fixed electrodes or else at the surface of the strip electrodes, or still on both types of said electrodes.

If pairs of electrodes applied on the strips are used, two well distinct capacitive values may also be obtained by interconnecting all these pairs of electrodes to ground. This may be performed for instance with the help of a metallic strip joining all the opposite pairs of electrodes of a same strip on one edge of the latter. These common electrodes may then be terminated by a connecting electrode located for instance at the end of the strip and which may be plugged in fixed terminals connected to ground. In this case, at the cross point where such a pair of electrodes connected to ground is located, the capacitative coupling will become very small, while at the other cross points, the series capacitive coupling will remain relatively high. At these other cross points an increase of the series capacity may anyhow be provided by one of the methods described above and using for instance a pair of electrodes interconnected together but not to ground.

It will be noted that capacitive couplings having two distinct values must not necessarily solely be constituted by series capacitive couplings, and in a general manner, capacitive coupling quadripoles may be used. Parasitic capacities to ground will anyhow be generally present even in the absence of relatively large shunt capacities designed to secure a relatively weak coupling. The method of grounding electrodes located on the strips presents nevertheless the disadvantage of necessitating metallic contacts permitting the grounding of these electrodes when the strips are plugged in. Yet, one of the features of the present memory is the absence of metallic contacts which are always a possible source of incorrect functioning or anyway which in general necessitate a certain amount of maintenance.

Another object of the invention is to realize a memory of the type previously defined in which one obtains two well distinct capacitive coupling values at the cross points and by avoiding absolutely all metallic contacts inside the memory.

In accordance with another characteristic of the invention, an information storage device as previously defined is furthermore characterized by the fact that said fixed electrodes are all mounted on the same plate of insulating material and that said strips bearing said third electrodes are inserted along one face of said plate in such a manner that said third electrodes cover a fixed electrode connected to a conductor out of said first set and another fixed electrode connected to a conductor out of said second set, this pair of fixed electrodes constituting a crosspoint but without said electrodes being superposed.

In this manner, the two fixed electrodes may be mounted on the same plate of insulating material, and for instance on the same face of the latter. At each crosspoint, each fixed electrode will occupy about half the elemental space defined at each crosspoint. If fixed electrodes are thus one next to the other and in the same plane, the residual capacity between them in the absence of a capacitive coupling produced by the strip will be small, being limited to a fringe effect. On the other hand, the presence of an electrode mounted on a strip at a short distance from a pair of fixed electrodes and covering the latter, will have the effect of producing a relatively high capacitive coupling.

Figure 2:
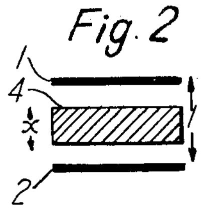
Figure 3:
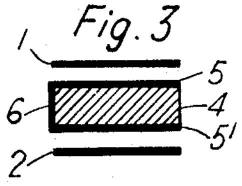
Figure 4:
Figure 5:
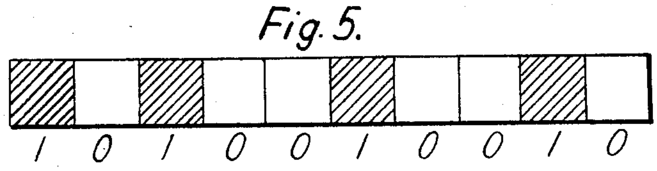
Figure 6:
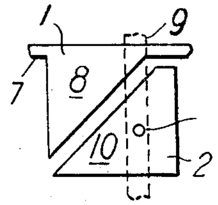
Figure 7:
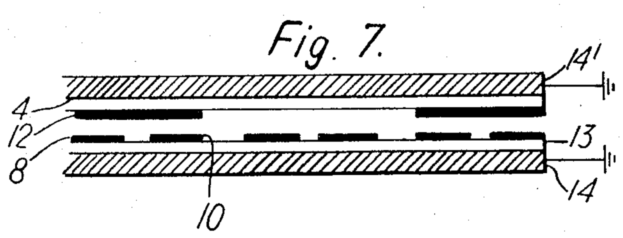
Figure 8:
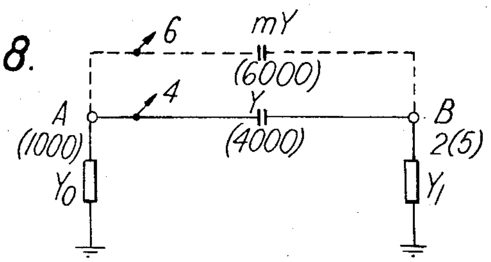
Figure 9:
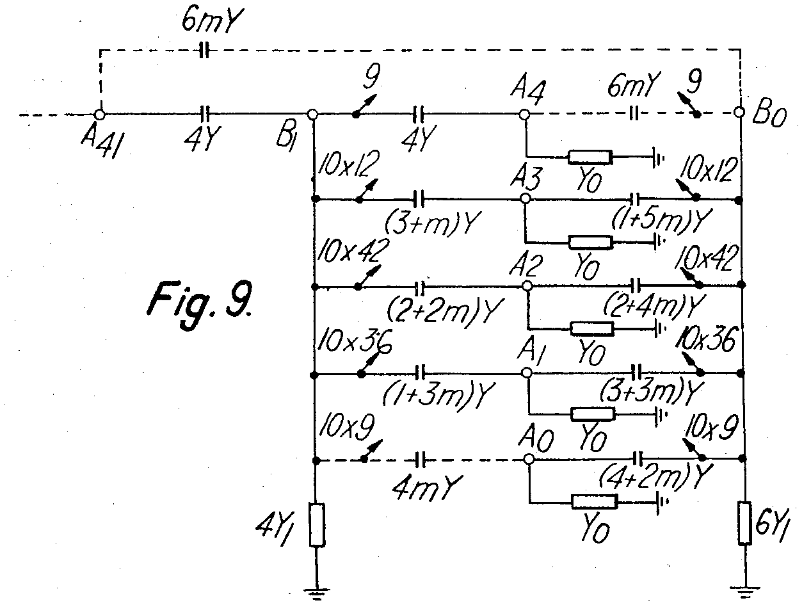
Figure 10:
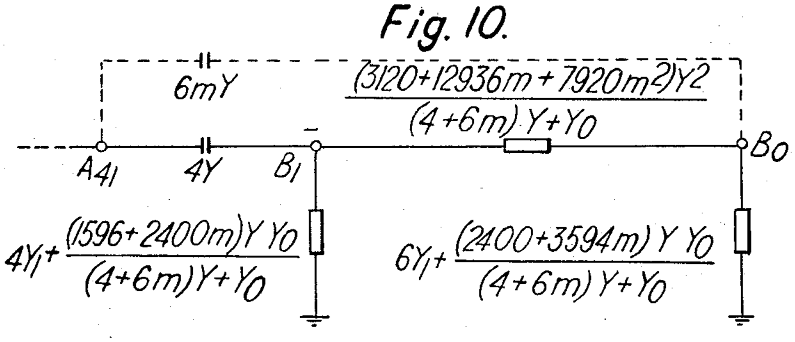
Figure 11:
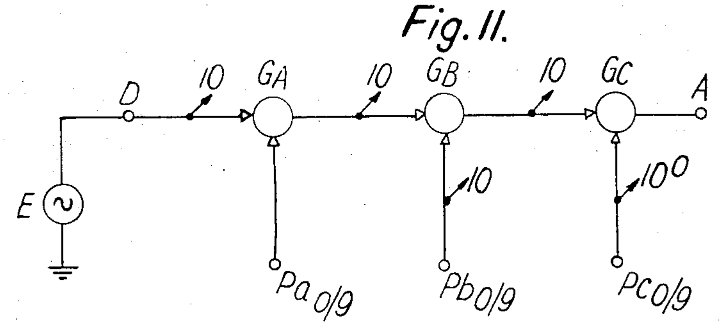
Figures 12, 13, 14:
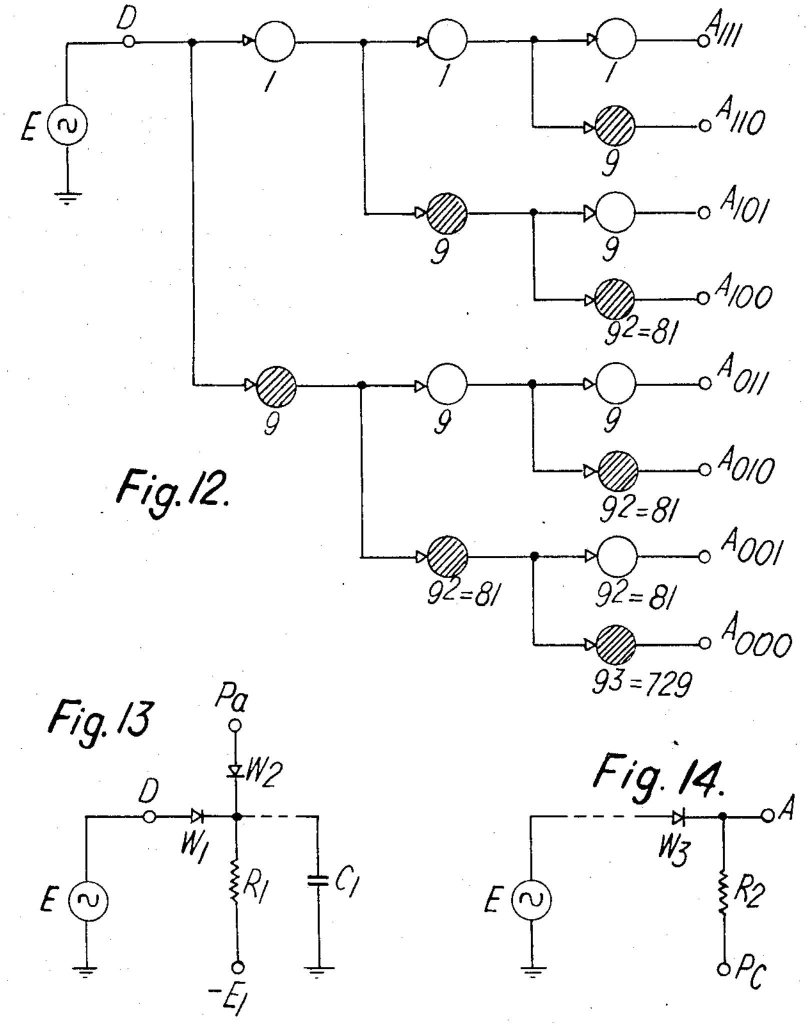
Figure 15:
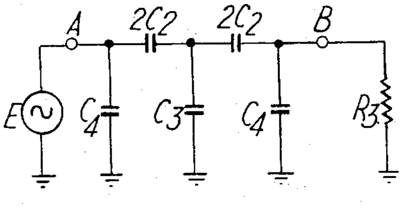
Figure 16:
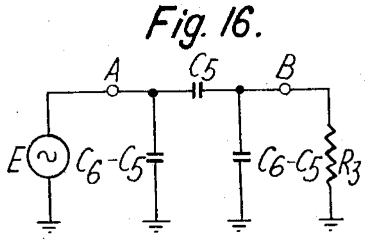
Figure 17:
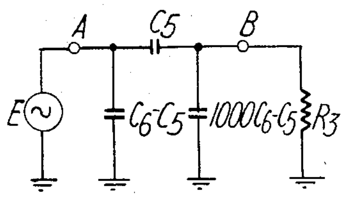
Figure 18:
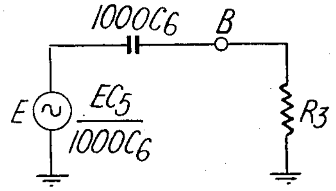

The above and other objects and characteristics of the invention will become more apparent by referring to the following detailed description of preferred embodiments of the invention to be read in conjunction with the accompanying drawings and which represent:

FIG. 1, a diagram of a crosspoint between two fixed electrodes;

FIG. 2, a cross-sectional view of a crosspoint showing the insertion of a dielectric provided by a sliding strip;

FIG. 3, a cross-sectional view similar to that of FIG. 2 but wherein a sliding strip is covered by an electrode;

FIG. 4, a cross sectional view similar to that of FIG. 3 but wherein the electrode borne by the sliding strip is grounded;

FIG. 5, a diagram of a sliding strip;

FIG. 6, a plan view of a cross-point when the fixed electrodes are on the same side of a plate of insulating material;

FIG. 7, a cross-sectional view of several crosspoints of the type shown in FIG. 6, including a sliding strip;

FIG. 8, an electrical circuit representing the couplings between the input electrodes and the output electrodes of the memory;

FIG. 9, an electrical circuit equivalent to that of FIG. 8, when one of the input electrodes is driven by a signal;

FIG. 10, an electrical circuit rigorously equivalent to that of FIG. 9;

FIG. 11, an electrical circuit representing an arrangement of electronic gates in the form of a tree network designed to drive the input electrodes of the memory;

FIG. 12, an electrical circuit equivalent to that of FIG. 4, when a set of gates is rendered conductive in order to transmit the input signal towards one of the output terminals;

FIG. 13, the circuit of one of the gates symbolically represented in FIG. 11;

FIG. 14, the circuit of a gate necessitating less elements than that represented in FIG. 13;

FIG. 15, a circuit of the capacitive network interconnecting an input electrode of the memory to an input electrode at a crosspoint rendered effective by the insertion of a sliding strip;

FIG. 16, an electrical circuit equivalent to that of FIG. 15;

FIG. 17, a circuit similar to that of FIG. 16, taking into account the parasitic capacitances placed in parallel on the load, at one of the output points, due to the coupling between other crosspoints than the one considered;

FIG. 18, a circuit equivalent to that of FIG. 17; and

Figure 19:
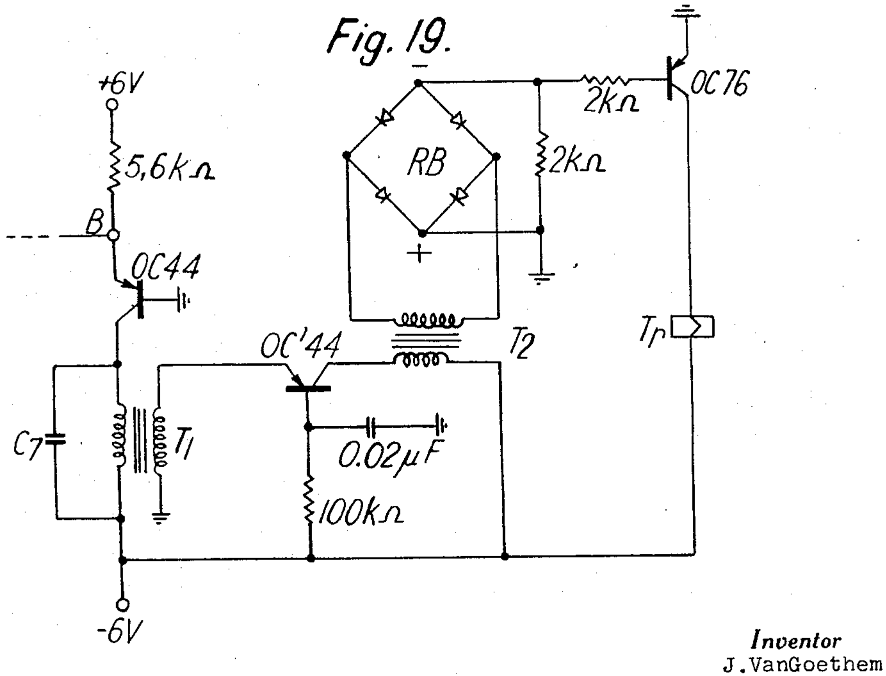

FIG. 19, the circuit of a detecting system permitting the operation of a relay upon the appearance of a signal at a corresponding output point of the memory.

By referring to FIG. 1, the latter shows an input electrode 1 of the capacitive memory and an output electrode 2 which is located in a plane parallel to that of electrode 1 but which is arranged perpendicularly to the latter. At the crosspoint 3 between these two fixed electrodes 1 and 2, which are only partially represented, one may insert a sliding strip (not shown in FIG. 1) made of insulating material in such a way that the dielectric constant of this material shall be able to produce a considerable change of the effective capacitance between the fixed electrodes 1 and 2. One may for instance provide as many sliding strips as there are fixed electrodes 1 and arrange them parallel to these, between the corresponding electrode 1 and the various fixed electrodes 2 which it will cross.

FIG. 2 shows a cross-sectional view of a cross-point and it is seen that in the volume comprised between the two fixed electrodes 1 and 2 passes a sliding strip 4. If one assumes a unitary distance between the two fixed electrodes 1 and 2, and that the thickness of the dielectric of the strip 4 is equal to $x$, the ratio between the initial capacitance in the absence of the strip 4, and the coupling capacitance present due to the insertion of the strip 4 whose dielectric constant is $k$, will be equal to $$1-x+\frac{x}{k}$$

Hence, at the crosspoint where the dielectric is provided by the strip, it will be possible to obtain a considerably higher capacitance than that offered at the crosspoints where the dielectric is not present, for instance due to an opening provided in the strip. The thicker the dielectric and the higher its constant, the greater will be the capacitance. Consequently it will be advantageous that the strip, at any rate at the crosspoints where a coupling capacitance is desired, should be as thick as possible. As it has been remarked already in the introductory part of the description, the strip may also bear electrodes.

This possibility is schematically represented in FIG. 3 where it is seen that the strip 4 is covered on its two opposite faces and at the desired crosspoints by the electrodes 5 and 5' which are interconnected on the side of the strip by a metallic part 6 so that the electrodes 5 and 5' actually form only a single electrode. In this case, at the crosspoints where the coupling strip offers the electrodes 5, 5' and 6, the increase of the coupling capacitance will be solely a function of $x$, the thickness of the strip, the dielectric constant $k$ of the latter having no influence, except at the crosspoints where the coupling electrodes are not provided. In the case of FIG. 3, the outside surface of the electrodes 5 and 5' mounted on the strips will be advantageously coated by an insulating varnish in order to avoid any metallic contact between these electrodes and the fixed electrodes 1 and 2. Moreover, one may also coat the latter with a suitable varnish on their surface which is on the side of the electrodes 5 and 5'. If the strips occupy practically all the thickness of the space between the fixed electrodes, the coating of all the metallic surfaces by a varnish will reduce the wear of these.

FIG. 4 shows an arrangement similar to that of FIG. 3 but wherein the electrodes 5, 5' and 6 supported by the strip are grounded. This connection to ground permits a small capacitive coupling to be obtained at the crosspoints where the strip bears the electrodes 5, 5', 6 but the grounding of these electrodes naturally necessitates a contact between these electrodes mounted on the strip and fixed terminals.

FIG. 5, shows in a schematic form an example of strips which may be inserted parallel to the input electrode strips and which are divided into ten elemental square surfaces each corresponding to a crosspoint between these input electrodes and the various output electrodes which are perpendicular thereto. There are ten crosspoints corresponding to ten successive squares on the strip where the shaded parts correspond to coupling electrodes such as 5. The strip is divided into two series of five successive squares and in each series there are two electrodes, permitting the signalling of an identity of the input electrode by signals appearing at the output electrodes on the base of a $$\binom{5}{2}^2$$

code. In this way, each of the input electrodes may be characterised by a particular code out of a hundred possible codes. A system of this capacity may for instance serve as class of line indicator in a telephone exchange. The number of lines using this common translator may be variable and in particular exceed the number of different possible codes. For instance, it will be possible to realize a memory provided with a thousand strips such as that shown in FIG. 5, in order to be able to characterize the class code of one thousand lines. At any desired moment one will be able to change the class of the line by a simple replacement of the removable strip corresponding to this line.

It is to be noted that if the strips such as shown in FIG. 5 may be indifferently inserted by one end or the other, it will not be necessary to provide a stock of one hundred types of different strips. By taking into account that ten out of a hundred codes will be symmetrical with respect to a longitudinal reversal of the strip, the number of different strips will only be equal to fifty-five instead of one hundred. One may still envisage the subdivision of each strip into several parts in the longitudinal sense, so as to reduce the number of different strips. For instance, one may envisage the insertion of these strips from two opposite sides of the memory and divide the strip into two parts each having a length of five units. In this case, and by also taking into account the fact that the half-strips may be inserted either in one direction or in the other, it will only be necessary to provide six different types of strips which will permit, by association of two halves end to end, to realize a hundred different codes. Another possibility for reducing the number of different types of strips and which does not necessitate the subdivision of the strips, will be explained later in relation with another particular embodiment which now be described.

FIG. 6 represents an elemental crosspoint surface having substantially the shape of a square and comprising the fixed electrode 1 which is only partially represented, as well as the fixed electrode 2 for which also, only a part is shown. The fixed electrode 1 extends in a horizontal direction in the form of a strip 7 relatively narrow, and at each crosspoint with the fixed electrodes extending in another direction, a triangular surface 8 is foreseen which occupies substantially half the square constituting the crosspoint. These fixed electrodes 1 may preferably be obtained in the form of a circuit printed on a base plate. On the same side of the base plate as the fixed electrodes, one will also print the half surfaces of the other fixed electrodes 2, and as indicated by the strip 9 in dotted lines, one will print on the other side of the insulating plate a vertical conductor permitting the interconnection of the triangles 10 in order to constitute the fixed vertical electrodes 2, after having established an electrical connection between triangles such as 10 and the conductor 9 located on the other side of this plate. This electrical connection through the base plate may be performed by any appropriate method such as that producing a metallic coating of the hole. In particular, one may use a recent technique foreseeing the use of connecting eyelets. Alternatively, the triangles 10 may be provided with an upturned edge along their vertical side which will pass through a corresponding slit in the base plate. The parts of these upturned edges appearing on the other side of the plate may then be electrically interconnected by vertical columns. Whatever the method used, there will be advantage in not producing too great additional thickness, if it is desired to stack a plurality of base plates in a restricted volume.

At the crosspoint shown in FIG. 6, in the absence of any other coupling means, one would have a capacitive coupling between the metallic surfaces 8 and 10 which will be relatively small since these two surfaces constituting the fixed selectrodes are no longer in front of one another but one next to the other and in the same plane. By the use of strips such as shown in FIG. 5, and extending either horizontally or vertically, when an electrode borne by the strip and having a substantially square shape, will come to rest above a pair of triangular surfaces 8 and 10, and at a short distance therefrom, in order to cover them, a relatively high capacitive coupling will be obtained between the fixed electrodes 1 and 2. In this way, the dielectric constant of the strip is practically without influence and it is only necessary to provide metallic electrodes on one face of the strip, i.e. that which faces the fixed electrodes 8 and 10.

As the coupling electrodes must now be provided only on one face of the strip, the opposite face of the strip may eventually be used to inscribe a different code. In this manner, by turning the face of the strip one may obtain a different code. Hence, in case of a stock of strips such as shown in FIG. 5 and which should provide a hundred codes, by taking into account the possibilities of the reversal of the direction of insertion of the strip and of the turning of the face thereof, it will only be necessary to provide twenty-eight types of different strips. Of course, at the crosspoints where the strip face contiguous to the electrodes 8 and 10 does not present a metallic coating and the opposite face of the strip presents an electrode, the latter should not introduce an appreciable coupling between the fixed electrodes 8 and 10. Such a coupling may be prevented by a suitable thickness of the strip so that when the electrodes borne by the latter are not on the side of the fixed electrodes, they do not introduce an appreciable coupling.

FIG. 7 show a partial cross sectional view of an arrangement such as represented in FIG. 6. It is seen that the strip 4 slides parallel to the electrodes such as 8 and 10 in such a way that the electrodes such as 12 carried by the strip come to cover the triangular electrodes 8 and 10 so as to obtain an effective capacitive coupling between these which is much larger than when the strip does not carry a square electrode such as 12. The fixed electrodes are mounted on a base plate 13 made of insulating material and of the type used for the realization of printed circuits. FIG. 7 does not represent the connections 9 serving to interconnect the electrodes 10 on the lower surface of the base plate 13. A metallic screen 14 has also been provided and during the stacking of several plate arrangements such as 13, the screens such as 14 and 14' which will be grounded provide a decoupling effect between the circuits belonging to the superposed plates. A suitable insulation will be provided betwen these screens and the connections 9, for instance by using a varnish or depressions in the screen corresponding to these connections.

But these screens 14 have also a decoupling effect with respect to the electrodes carried by a single base plate only. Indeed, a metallic grounded screen such as 14 and located at a small distance from the fixed electrodes such as 8 and 10, considerably diminishes the residual capacitive coupling which is present between a pair of elctrodes 8 and 10 at a given crosspoint, and this in the absence of a coupling electrode such as 12. The more the plane of the screen 14 is brought nearer to the plane of the electrodes 8 and 10, the greater will be the diminution of the A.C. energy transfer between these electrodes, which tends towards a minimum value when the distance between the face of the screen 14 located on the side of the electrodes 8 and 10, and the corresponding faces of the latter, has reached a value which is of the order of the distance separating these electrodes 8 and 10. Similiarly, the parasitic residual couplings between fixed electrodes pertaining to adjacent rows or columns will also be considerably reduced by the adjunction of these screens 14 at a sufficiently small distance from the plane of the fixed electrodes. An effect of the screen 14 will of course be to increase the parasitic capacitance to ground of the fixed electrodes, parasitic capacitances which will also be present when the electrode 12 carried by the strip will effect the couplings between the electrodes 8 and 10. But the screen gives a favourable effect so as to produce a better discrimination between the desired capacitive couplings and the residual capacitive couplings. On the other hand, the smaller the spacing between the electrodes 12 and the electrodes 8 and 10, the tighter will be the desired capacitive coupling.

The strip 4 shown in FIG. 7 carries electrodes such as 12 only on one face. As mentioned above, it will also be possible to provide electrodes constituting another code on the opposite face of the strip. In this case these electrodes, when they are not effectivly used to provide a coupling, will be located in front of the screen 14' of the next plate. As this screen is grounded and since the distance will be small, these electrodes on the opposite face of the strip will have little influence in case where they coincide with crosspoints where a capactive coupling between the fixed electrods is not desired.

The lower surface of the screens can also be provided with ribs (not shown) extending parallel to the strips 4 below the lower surfaces of the screens so that these ribs constitute guiding means for the strips.

The various plates and the intermediate screens may be stacked on a frame provided with appropriate guiding means. One may envisage for instance a stack of fifty plates each having twenty input conductors and ten output conductors so as to constitute a semi-permanent memory of one thousand words, each comprising ten binary bits.

It will be noted that it is not absolutely essential to arrange the two types of fixed electrodes on the same surface of the plate of insulating material. In principle it will be possible to locate them on opposite sides of this plate on condition that the thickness of the latter will be relatively small. In this case, the fixed electrodes such as 8 and 10 will be in distinct parallel planes but with a very small distance between these.

In any static translating circuit comprising various couplings between input points and output points, there evidently exists a decoupling problem in the sense that part of the energy applied to an input point and destined to reach a combination of output points characterising this input point will be deviated towards other output points due to back-up through other input points.

FIG. 8 shows a symbolic representation of the equivalent electrical circuit of a capacitive memory as described above and comprising a thousand input points A and ten output points B, each input point A being connected through series capacitances, each of admittance Y towards four particular B points, two being always chosen among a first group of five B points and the other two in the second group of five B points. In this manner each point A may have one characteristic among one hundred possible characteristics.

Each A point is represented as connected to ground through an admittance $Y_0$ while each B point is connected to ground through an admittance $Y_1$. These two admittances may be constituted by the input and the output impedances of the transmitting network and also comprise the parasitic capacitances to ground. The multipling arrow provided with the digit 4 indicates the connections between the points A and B. Moreover, additional connections between the points A and B have been represented in dotted lines and comprise a capacitance having an admittance $mY$. This capacitance represents the residual coupling which exists between each A point and the six B points to which this A point is not connected via capacitances indicated by Y and corresponding to those introduced by the coupling strips.

In such a network, when a particular A point is fed by an A.C. energy source, the four B points which are associated therewith through the admittances Y will be brought to an operating potential in order to characterise the particular A point among the thousand points. However, the potential of the other six points will not be altogether equal to that of ground due to the back-up couplings mentioned above and also due to the residual coupling capacitances shown in FIG. 8.

In order to investigate the amount of parasitic couplings, i.e. the importance of the voltages at the B points which must not be activated, the eventual symmetry of the circuit must be examined in order to deduce an equivalent electrical circuit showing the importance of the parasitic couplings. The symmetry of the circuit depends not only on that of the capacitive memory shown in FIG. 8, but also on that of the input network which will be used to couple the energy source to a particular A point among the thousand points. This system of coupling of the source towards the different A points constituting the inputs of the capacitive memory may consist in a network of gates arranged in stages in the form of a tree network whose principle is well known. This network will in fact be described later. If the network of access gates is sufficiently efficient so that it transmits only a very small part of the source energy to the other A points than that which is identified, one may separately perform the analysis of the two networks, i.e. that of the access network and the other constituting the capacitive memory.

In this case, FIG. 9 represents the equivalent electrical circuit of the network of FIG. 8 when a particular A point among the thousand is fed by an A.C. energy source. The equivalent circuit of FIG. 9 assumes on the other hand that the thousand input A points are equally distributed among the hundred possible codes provided by combinations of four B points simultaneously activated. This is an entirely ideal distribution which does not in any way correspond to practical cases in the event of a translator serving to determine the class of telephone lines, since a large number of lines may belong to the same class and be characterized by a same code. Nevertheless these conditions of absolute symmetry enable the establishment of an equivalent network which at least shows the order of the magnitude of parasitic couplings.

In the case of FIG. 9, a point $B_1$ and a point $B_0$ have been shown which correspond respectively to the common potentials of the four activated B points and to the common parasitic potentials of the six B points which must not be activated. Hence, the admittance interconnecting these points $B_1$ and $B_0$ to ground must be respectively equal to 4 $Y_1$ and 6 $Y_1$ as shown in the figure. On this basis of two types of B points when the circuit is driven, the A input points are divided into five categories: those such as the driving point which are connected to four B points which must be activated, those which are only connected to three points which must be activated, and so on.

If there were only one hundred input points and a unique correspondence between each possible code and an A point, there would be a single A point ($A_4$) connected to the four activated B points, twelve ($A_3$) connected to three activated B points, forty-two ($A_2$) to two, thirty-six ($A_1$) to one, and nine A points ($A_0$) solely connected to B points which are not activated. As there are ten A points per code, these numbers must thus be multiplied by ten. The potential of these different types of A points is the same for all the points of a same type which permits the establishment of the complete network of FIG. 9. The point $A_{41}$ represents the driving point which is connected by the admittance 4Y to the point $B_1$ and by an admittance $6mY$ to the point $B_0$. The point $A_4$ corresponds to the other nine A points which are also connected to the $B_1$ and $B_0$ points by admittances respectively equal to 4Y and $6mY$, and this parallel network in the form of a T is shown in FIG. 9 and provided with multipling arrows marked with the digit 9 to indicate the number of these T networks which are in parallel.

The T networks comprising the points $A_3$, $A_2$, $A_1$ and $A_0$ are easily justified from what precedes.

FIG. 10 represents a network strictly equivalent to that of FIG. 9 but in which all the points $A_{0/4}$ have been eliminated by star-mesh transformations. In addition to the direct capacitive couplings between the point $A_{41}$ and the points $B_1$ and $B_0$, one obtains equivalent admittances between the points $B_1$ and $B_0$, and between each of these points and ground. The values of these resulting admittances are indicated in FIG. 10.

So as to have a potential for the point $B_0$ which is as small as possible with respect to that of point $B_1$, it is necessary that the admittance between the point $B_0$ and ground should be as high as possible with respect to the admittance between the points $B_1$ and $B_0$. This may be obtained by relatively high values both for $Y_0$ and for $Y_1$. In other words, the shunt impedances at the input and at the output of the capacitive network must be as low as possible. However, it is clear that as the admittances $Y_0$ and $Y_1$ are increased, the resultant admittance between the point $B_1$ and ground will also increase and consequently there will be an increase in the attenuation of the usual signals. Thus it will be of interest, particularly for $Y_0$, to choose a sufficiently high admittance so as to limit the effect of back-up couplings without introducing an excessive attenuation of the useful signals which would lead either to too high a level for the driving source, or to too low a level at the receiving end, in such a manner that noise and parasitic signals would become a problem and would complicate the amplifying and detecting system which must be provided for each of the B points.

If the admittances Y correspond to capacities of a few picofarads only, which will be the case particularly if the elemental surfaces of the crosspoints are relatively small, and if for instance the signal is constituted by a source having a frequency of 250 kc./s., $Y_0$ might correspond to an impedance of the order of 1500 ohms while $Y_1$ might correspond to an impedance of the order of 25 ohms.

The resultant admittance between the poinnts $B_1$ and $B_0$ clearly shows the influence of $m$ which characterizes the value of these parasitic series capacitances. If $m$ is reasonably smaller than unity, the terms proportional to $m$ and $m^2$ will become of secondary importance.

It will be recalled that the circuit of FIG. 10 is valid only in the case of absolute symmetry. In practice however, the resultant admittances shown in FIG. 10 are rather representative. Indeed, if one considers for instance the most unfavourable case for the resultant admittance between the points $B_1$ and $B_0$, i.e. when all the A points, with the exception of the driving point, are each connected to two activated B points and to two unactivated B points, the equivalent series admittance will be equal to $$\frac{999(2+2m)(2+4m)Y^2}{(4+6m)Y+Y_0}$$

which, when $m$ is reasonably smaller than unit, is not very much larger than the admittance shown in FIG. 10.

The importance of the parasitic signals solely due to the capacitive memory having now been determined; the influence of the parasitic signals, due to the fact that the gate access circuit to the capacitive memory is not ideal, will now be examined.

FIG. 11 represents the principle of an access circuit of a known type in which the gates are distributed in three stages in the form of a tree. The A.C. energy source E present at point D is applied in parallel, as indicated by the multipling arrow marked by 10, towards ten gates $G_A$ respectively controlled at control points $Pa_{0/9}$. The outputs of each of the primary gates $G_A$ are in turn connected in parallel towards ten gates $G_B$ which are controlled from the ten control points $Pb_{0/9}$ of the second stage. In turn the outputs of the gates $G_B$ are each connected in parallel to ten gates $G_C$ forming the third stage of the access circuit, which gates are controlled from the ten control points $Pc_{0/9}$. Finally, the outputs of the thousand gates $G_C$ constituting the third stage correspond to the input points A of the capacitive memory.

The principle of such a gate network is well known and can be found for example in U.S. Patent No. 2,724,018. The thirty control points are associated with the eleven-hundred and ten gates in such a manner that the simultaneous presence of a control pulse at one of the control points in each series of ten opens a path between the single input point D and the particular output point A corresponding to this combination of control points. When such a control is applied to the gate network in order to realize such a connection, one may establish the electrical circuit equivalent to that of FIG. 11 by using the method of the points having the same potential and already considered in relation to the capacitive memory (FIG. 9).

FIG. 12 shows the equivalent circuit of the gate network of FIG. 11 when a particular conductive path is established between the point D and the point $A_{111}$ through three gates in cascade, all three conductive. As shown in FIG. 12, at each branch point of the gate network one goes towards a gate made conductive and on the other hand towards nine other gates of the same rank which are blocked. Due to the symmetry of the circuit one may consider that these blocked gates are all in parallel so that for the primary stage of gates $G_A$ for instance, the ten gates are divided into a conductive gate and nine blocked gates which have been represented by a single one in FIG. 12 with cross hatchings inside the circle symbolically representing the gate. The ten gates $G_B$ connected at the output of the gate $G_A$ made conductive are divided in exactly the same way as indicated in the figure, while the ninety remaining gates $G_B$ connected to the outputs of the nine blocked gates $G_A$ are also divided in the same proportion of 1 to 9. The distribution of the gates of the third stage is immediately deduced from the preceding considerations and for three stages of gates one reaches therefore eight types of output points $A_{000/111}$ whose respective numbers have been indicated next to the gates of the third stage.

If the attenuation of the blocked gates is not infinite, all the A outputs will thus receive a certain residual signal. So as to limit the effect of these residual signals on the capacitive memory one may impose a limiting value for the sum of these residual signals by assuming the most unfavourable case where these are superposed in phase. This sum of residual voltages at the nine-hundred-and-ninety-nine A points which must not be activated can for instance be limited to 5% of the source voltage, i.e. approximately that which reaches the selected point. If $a$, $b$ and $c$ are the respective attenuations provided by the blocked gates, depending on whether they pertain to the first, the second or the third stage, one may neglect the residual voltages at the A points reached by means of at least two cascaded blocked gates. Indeed, these residual voltages will evidently be much smaller than those obtained at the A points connected to the source by means of a single blocked gate, and particularly if the values of $a$, $b$ and $c$ are relatively very small with respect to unity. In this case, only the nine points $A_{110}$, the nine points $A_{101}$ and the nine points $A_{011}$ are left to be considered as bringing a contribution to the sum of the residual output voltages. With $a$, $b$ and $c$ all three equal to 0.002, a total residual voltage equal to 5.4% of the source voltage will thus be obtained. To secure a sufficiently small value for the attenuation of the blocked gates electronic gates comprising two diodes might be used.

FIG. 13 shows a gate of this type. The A.C. sinusoidal input voltage F applied to point D drives the diode gate which comprises a first series rectifier $w_1$ whose anode is connected to point D and whose cathode constitutes the output terminal of the gate. This cathode is also connected to a biassing potential $-E_1$ through a resistor $R_1$. Moreover, this cathode of the rectifier $W_1$ is still connected to the control point P*a* through a shunt diode $W_2$ whose cathode is connected to that of $W_1$. Finally, one must also take into account the capacitive load at the output terminals of the gate, load represented by the condenser $C_1$.

The biassing potential $-E_1$ may be equal to $-12$ volts when the amplitude of the signal from the sinusoidal source E is of 6 volts, while the potential of the control point P*a* will normally be of $+6$ volts to reach $-6$ volts when it is desired to unblock the gate. Indeed, with a potential of 6 volts at terminal P*a*, rectifier $W_2$ is conductive and rectifier $W_1$ is blocked. With $-6$ volts at terminal P*a* one reaches the reverse situation and the signals from the source E can be transmitted through the gate. In order that the gate should be efficient when it is made conductive, it is necessary that at any moment rectifier $W_1$ should not be biased in the reverse sense, which demands that the D.C. current drawn by $R_1$ should be higher than the maximum instantaneous current supplied by $w_1$. This A.C. current is a function of $R_1$ and of the impedance offered by $C_1$ at the frequency used. For a frequency of 250 kc./s. and for a value of $C_1$ of the order of 100 picofarads, this condition leads to a value of $R_1$ of the order of 10 kilo-ohms as upper allowable limit with the voltages considered.

On the other hand, when the gate is blocked its attenuation is substantially proportional to the ratio between the dynamic resistance of rectifier $W_2$ and the reactance introduced by the residual capacitance of $W_1$ whose conductance can be neglected when this rectifier is blocked. The load offered by the circuit $C_1R_1$ may in this case be neglected. By using OA85 diodes, the dynamic resistance of $W_2$ is of 200 ohms, while the parasitic capacitance of $W_1$ is of 2 picofarads, which gives a value of $a=1/600$ for a frequency of 250 kc./s.

Thus it is seen that this value of *a* is more than sufficient to secure a total residual voltage of the order of 5% of that of the source. On the other hand, the attenuation provided by a gate comprising a single diode only would not be sufficient for the rather high frequencies considered, due to the capacitance of the blocked diodes.

FIG. 14 represents a similar gate where there is solely one series rectifier $W_3$ whose cathode is connected to the control point P*c* through the resistance $R_2$. If a value of 1500 ohms is chosen for $R_2$, the attenuation of the gate of FIG. 14 will be equal to $1/212$ for the frequency considered.

It is particularly advantageous to realize the gates $G_C$ (FIG. 11) of the third stage in the simplified form of FIG. 14, while the gates $G_A$ and $G_B$ of the first and the second stages will be realized in the form shown in FIG. 13. In this case, the total residual voltage will be equal to 5.3% of the source voltage which is a satisfactory value and similar to that obtained when all the gates give an attenuation of 0.002. But, the mixed system offers the advantage that the gates $G_C$ which are by far the most numerous necessitate only a single diode.

By referring to FIG. 15, one will now examine the useful signal transmitted by the capacitive memory. This signal depends first on the series coupling capacitance obtained at the crosspoint with the help of the coupling strip. However, particularly when using a screen such as 14 (FIG. 7) the shunt capacitance towards ground must be taken into account. By referring jointly to FIGS. 7 and 15, one may thus consider that the series coupling capacitance is divided into two capacitances of values $2C_2$ interconnected in series between the points A and B and corresponding to the capacitances between the electrodes 8 and 12, and 12 and 10. FIG. 15 shows that the junction point of these two capacitances is connected to ground through a condenser $C_3$ which corresponds to the capacitance between the strip electrode 12 and ground, to which the screens are connected. One may also consider the parasitic capacitances $C_4$ towards ground between the fixed electrodes 8 and 10 which may be assumed to be approximately equal. In principle $C_4$ will be of the order of half the value of $C_3$.

Thus, FIG. 15 shows an A input point of the capacitive memory connected to a B output point through a capacitive network including several branches, the resistance $R_3$ connected to point B representing that of the detector.

The network of FIG. 15 may be simplified to the form shown in FIG. 16 where $C_5$ represents an equivalent series capacitance and $C_6-C_5$ equivalent shunt capacitances.

By referring to FIG. 10, with sufficiently high values for $Y_0$ and $Y_1$, point $B_0$ is practically grounded and in a general manner one may consider that the main effect of the back-up is then to introduce a parasitic shunt admittance in shunt across the detector to be activated, i.e. between point $B_1$ and ground. This amounts to consider that the nine-hundred-ninety-nine A points with the exception of that which is driven are practically at ground potential and consequently for the coupling circuit of FIG. 16 one may assume the most unfavourable case, that for which all the A points are connected to the four B points which must be activated. Hence, each coupling circuit from an A point other than that which is driven will introduce a parasitic capacitance equal to $$(C_6-C_5)+C_5=C_6$$

at point B.

By taking into account the shunt effect of the other circuit, the equivalent coupling circuit of FIG. 16 thus becomes that of FIG. 17.

From Thevenin's theorem this is transformed into a simple series circuit represented in FIG. 18.

If it is assumed for instance that $C_5$ is equal to 10 picofarads while $C_6$ is equal to 12.5 picofarads, that $R_3$ is equal to 25 ohms, while the R.M.S. voltage of the source of 250 kc./s. is 4 volts, a voltage of the order of 1.4 millivolts is obtained at point B. This voltage producing a small current through resistance $R_3$ will have to be amplified to provide a useful operating signal particularly in the case where the useful signals must operate a relay.

FIG. 19 represents a detecting circuit to be connected to point B in order to be able to cause the operation of a relay T*r* corresponding to a particular B point. A low input impedance of the order of 25 ohms ($R_3$) may be obtained at the B point by using an OC44 transistor connected with a grounded base to constitute the first amplifying stage. The emitter of this transistor is directly connected to point B and is biassed through a resistor of 5.6 kilo-ohms by a voltage of $+6$ volts, the base of this transistor is directly connected to ground, while the collector is biassed to a voltage of $-6$ volts through the primary winding of a transformer $T_1$ shunted by a tuning condenser $C_7$. This condenser $C_7$ may be chosen so as to obtain resonance at a frequency of 250 kc./s. It may however be found advantageous to use a tuning condenser which is as small as possible and constituted for instance by the output capacitance of the OC44 transistor and the parasitic capacitance of transformer $T_1$, in order to reduce the response time of the detecting circuit. The response time essentially depends on the shape of the control pulse, on the speed of response of the diodes used for the electronic gates, as well as from the Q of the transformers used in the detecting circuit of FIG. 19. This response time may anyhow be made arbitrarily small by using a sufficiently high frequency. With a frequency of 250 kc./s. a response time of the order of 10 to 15 periods of the signal frequency, i.e. 50 microseconds, may readily be obtained, but this value could be reduced by diminishing the selectivity of the detecting circuit.

Transformer $T_1$ steps down the voltage in a ratio which may be of the order of 20 to 1, and by way of example, the primary inductance may be of the order of 50 millihenries by using a ferrite core exhibiting an optimum Q in the neighbourhood of the signal frequency. This first amplifying application stage may readily give a current gain of the order of 15.

The secondary winding of transformer $T_1$ is on the one hand connected to ground and on the other hand to the emitter of the second transistor OC'44 also operated with a common base fashion, the latter being connected to the voltage of —6 volts through a resistor of 100 kilo-ohms and to ground through a decoupling condenser of 0.02 microfarad. The collector of this transistor is also connected to the voltage of —6 volts through the primary winding of transformer $T_2$ which steps down the voltage in a ratio of two to one, its secondary winding being connected to a rectifier bridge RB using for instance OA85 diodes. This rectifier bridge is destined to feed the output stage of the detecting circuit and provides not only a DC voltage, but also acts as noise suppressor by absorption of signals having a too small level. The output of this bridge is branched on a resistor of 2 kilo-ohms of which one end is grounded, while the other end is connected to another resistor of 2 kilo-ohms feeding the base of an output OC76 transistor whose emitter is grounded and whose collector goes to the voltage of —6 volts through the winding of relay *Tr*. The signal noise ratio may still be improved by the insertion of a suitable nonlinear circuit at the input of the output stage.

While the principles of the invention have been described above in connection with specific apparatus, it is to be clearly understood that this description is made only by way of example and not as a limitation on the scope of the invention.

I claim:

1. An information storage device comprising a first set of substantially parallel electrical conductors, a second set of substantially parallel electrical conductors, arranged substantially at right angles to said first set so as to form a coordinate array of crosspoints, each crosspoint containing one conductor of said first set and one conducor of said second set, a plurality of removable units, there being one for each row of crosspoints, said removable units being insertable between the conductors of each crosspoint in the associated row, said unit being positioned closely spaced from said crosspoint conductors, means on each of said units cooperating with at least some of the crosspoints in the row associated with that unit for altering the capacity between the conductors at those crosspoints so that the effective capacitive coupling of each crosspoint will assume one or the other of two substantially distinct values, the units for altering the capacity of the said crosspoints comprising a plate of dielectric material and a common electrode mounted on the removable units.

2. An information storage device, as defined in claim 1, in which the common electrodes are connected to ground.

3. An information storage device comprising a first set of substantially parallel electrical conductors, a second set of substantially parallel electrical conductors, arranged substantially at right angles to said first set so as to form a coordinate array of crosspoints, each crosspoint containing one conductor of said first set and one conductor of said second set, a plurality of removable units, there being one for each row of crosspoints, said unit being positioned closely spaced from said crosspoint conductors, means on each of said units cooperating with at least some of the crosspoints in the row associated with that unit for altering the capacity between the conductors at those crosspoints so that the effective capacitive coupling of each crosspoint will assume one or the other of two substantially distinct values, in which each crosspoint includes a first and a second fixed electrode, a plate of insulating material on which all of the fixed electrodes are supported, said fixed electrodes being spaced from each other in a planar direction, the said unit carrying the capacity altering means being mountable along one face of said plate, the fixed electrodes in a row being mounted on one face of the insulating plate, each fixed electrode of each crosspoint having one straight edge with the straight edges of each pair of fixed electrodes being closely spaced, one of said common electrodes being mounted on said removable unit to overlap one pair of said fixed electrodes, and further comprising a grounded metallic screen mounted on the opposite side of the insulating plate from the removable units and spaced from the fixed electrodes, whereby parasitic couplings between the fixed electrodes approach a minimum value.

4. An information storage device comprising a first set of substantially parallel electrical conductors, a second set of substantially parallel electrical conductors, arranged substantially at right angles to said first set so as to form a coordinate array of crosspoints, each crosspoint containing one conductor of said first set and one conductor of said second set, a plurality of removable units, there being one for each row of crosspoints, said unit being positioned closely spaced from said crosspoint conductors, means on each of said units cooperating with at least some of the crosspoints in the row associated with that unit for altering the capacity between the conductors at those crosspoints so that the effective capacitive coupling of each crosspoint will assume one or the other of two substantially distinct values in which each crosspoint includes a first and a second fixed electrode, a plate of insulating material on which all of the fixed electrodes are supported, said fixed electrodes being spaced from each other in a planar direction, the said unit carrying the capacity altering means being mountable along one face of said plate, and a plurality of said devices being arranged in a stack with the plates being placed one on top of the other and a grounded metallic screen separating each device from the next adjacent device.

5. A selecting circuit for designating one out of a plurality of output leads corresponding to an input signal in binary code comprising a capacitive matrix having row and column electrodes, individual capacitive coupling means between selected row and column electrodes, a plurality of signal sources, means for connecting outputs of said signal sources to said matrix column electrodes, signal detecting means comprising an output means connected between each of said row electrodes and a corresponding one of said output leads, means for applying pulses to all of said output means, and means including said capacitive coupling means for energizing one of said output means wherein said capacitive coupling means further comprises an interchangeable ground conducting sheet insulated from said row and column electrodes.

References Cited

UNITED STATES PATENTS

| | | | |
|---|---|---|---|
| 2,603,716 | 7/1952 | Low | 340—166 |
| 2,828,447 | 3/1958 | Mauchly | 340—166 |
| 2,884,617 | 4/1959 | Pulvari | 340—166 |
| 2,231,035 | 2/1941 | Stevens | 324—61 |
| 2,544,673 | 3/1951 | Haber | 324—61 |
| 2,844,811 | 7/1958 | Burkhart | 340—147 |
| 3,003,143 | 10/1961 | Beurrier | 340—173 |
| 2,546,784 | 3/1951 | Roggenstein | 324—123 |
| 2,719,192 | 9/1955 | Rex | 324—249 |
| 2,872,664 | 2/1959 | Minot | 340—173 |
| 3,011,156 | 11/1961 | MacPherson | 340—166 |
| 3,098,996 | 6/1963 | Kretzmer | 340—173 |

TERRELL W. FEARS, *Primary Examiner.*

IRVING L. SRAGROW, STEPHEN W. CAPELLI, BERNARD KONICK, *Examiners.*

N. N. KUNITZ, H. D. VOLK, *Assistant Examiners.*